(12) United States Patent
Polivy et al.

(10) Patent No.: US 7,779,427 B2
(45) Date of Patent: Aug. 17, 2010

(54) AUTOMATED APPLICATION CONFIGURATION USING DEVICE-PROVIDED DATA

(75) Inventors: Daniel J. Polivy, Seattle, WA (US); Sriram Viji, Seattle, WA (US); Andrew J. Fuller, Redmond, WA (US); Matthew P. Rhoten, Kirkland, WA (US)

(73) Assignee: Microsoft Corporation, Remond, WA (US)

( * ) Notice: Subject to any disclaimer, the term of this patent is extended or adjusted under 35 U.S.C. 154(b) by 1113 days.

(21) Appl. No.: 11/335,234

(22) Filed: Jan. 18, 2006

(65) Prior Publication Data
US 2007/0169129 A1 Jul. 19, 2007

(51) Int. Cl.
G06F 3/00 (2006.01)
G06F 9/44 (2006.01)
G06F 9/46 (2006.01)
G06F 13/00 (2006.01)

(52) U.S. Cl. .......................... 719/327; 719/321; 710/8
(58) Field of Classification Search ................. 719/321, 719/327; 710/8
See application file for complete search history.

(56) References Cited

U.S. PATENT DOCUMENTS

| 2002/0116543 A1* | 8/2002 | Wilson ........................ 709/321 |
| 2006/0055963 A1* | 3/2006 | Otsuka et al. .............. 358/1.15 |
| 2006/0281490 A1* | 12/2006 | Dolgas et al. ............. 455/556.2 |
| 2009/0089463 A1* | 4/2009 | Iga ............................... 710/37 |

* cited by examiner

Primary Examiner—Diem K Cao
(74) Attorney, Agent, or Firm—Workman Nydegger (57) ABSTRACT

Described is a technology by which a device pre-enables application programs of a computer system to work with the device when the device is connected to the computer system. A set of data is obtained from a device, such as by an installer at installation time. The set of data includes information that identifies one or more computer system application programs that the device desires to work with when each application program runs. When the data set is obtained, the application program is enabled (e.g., given appropriate permissions) such that the application program may communicate data with the device when the program is run on the computer system. In one implementation, a device driver provides an installer with access to the data set, which may also include additional information such as application configuration parameters. The installer may be automatically run on the computer system upon initial device detection.

17 Claims, 5 Drawing Sheets

AUTOMATED APPLICATION CONFIGURATION USING DEVICE-PROVIDED DATA

BACKGROUND

When connecting a new device to a computer system running a contemporary operating system such as Microsoft® Windows, the system or user typically installs a device driver. In addition, the user will often have to install one or more application programs that make use of the device. For example, a device manufacturer may provide an application program on a CD-ROM with the device.

Computer device manufacturers alternatively expect their devices to be used with particular application programs that are independently installed on the device, such as one or more third-party programs that are relevant to the device. For example, a media player device may be designed to work with Windows® Media Player, while an auxiliary display device may be designed to display email messages, notifications and calendar data from a program such as Microsoft® Outlook.

However, with some devices, enabling the device to work with a given program may be complicated for some users. For example, to allow an existing application program's content to appear on an auxiliary display, the user will need to enable the application programs that provide this content to communicate with the auxiliary display device. This may require making changes to the registry, which is a somewhat dangerous activity when performed by users. A control panel applet or the like is one safe way the user can enable application programs to work with a device, however this is not necessarily an easy task, as there are various types of devices that a user can add, each possibly having substantially different characteristics and requiring different types of application programs for the device to work properly. Moreover, the user may not yet have installed a particular application, and there is no way to pre-enable the application program for use with the device should the application program be installed later.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a main computer system obtaining a set of data from a device, in which the set of data includes information that identifies an application program with which the device desires to communicate data when the application program runs on the main computer system. When obtained, the application program is enabled such that it may communicate data with the device when the application program is run on the computer system. In one implementation, a device driver that facilitates communication between the computer system and the device provides an installer (that is running on main computer system) with access to the data set.

For example, by exchanging data between a driver of a device and an operating system component of a computer system, the data may correspond to device-specified information indicative of at least one application program that the device wants to communicate with when the application program is running. The operating system component processes the data to enable each application program to communicate with the device when that application program is run on the computer system.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
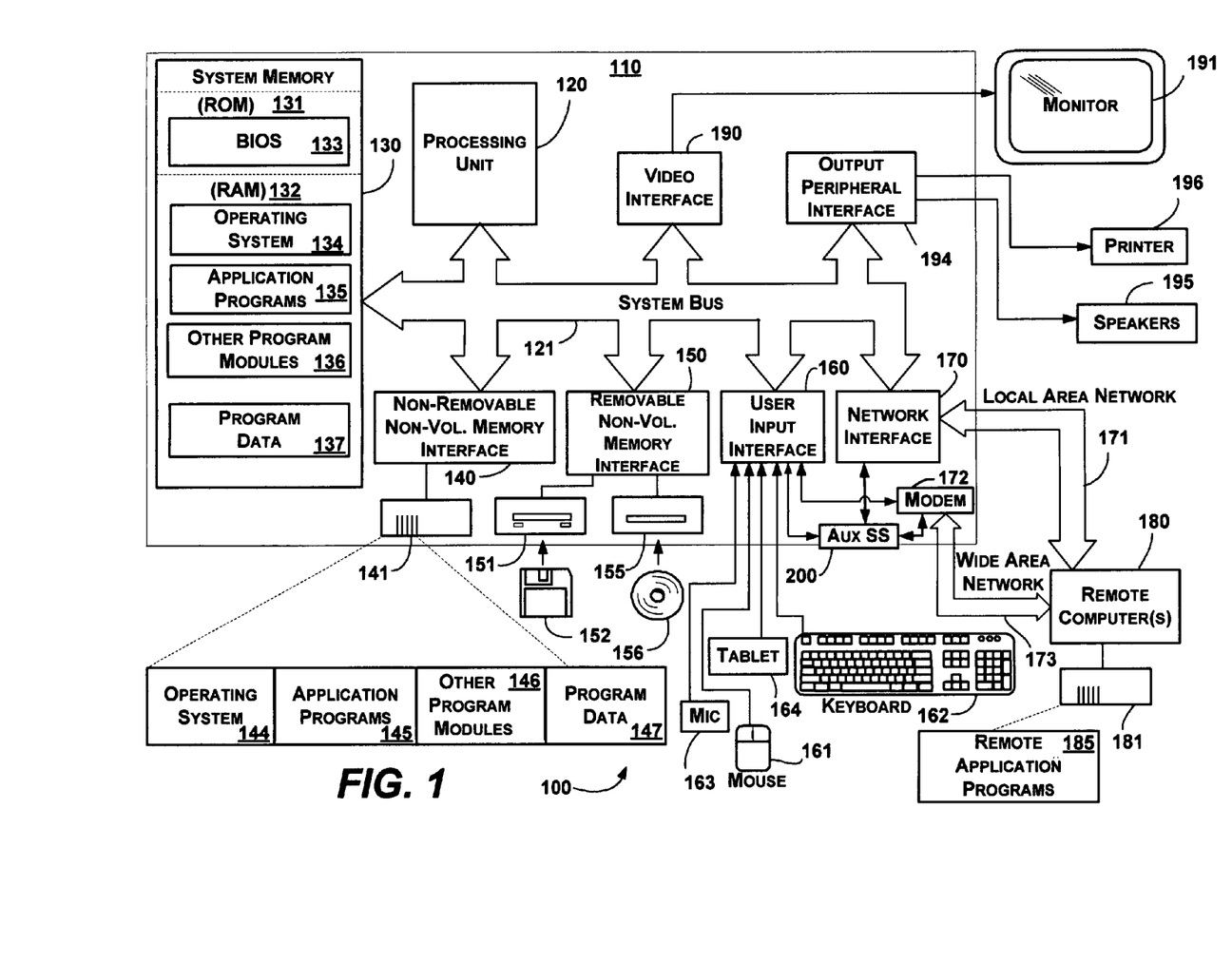
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

An auxiliary display subsystem 200 may be connected via the user interface 160 to allow data such as program content, system status and event notifications to be provided to the user, even if the main portions of the computer system are in a low power state. The auxiliary display subsystem 200 may be connected to the modem 172 and/or network interface 170 to allow communication between these systems while the main processing unit 120 is in a low power state.

Automated Application Configuration

Various aspects of the technology described herein are directed towards automatically enabling and configuring applications to work with devices added on to a main computer system. In general, much of the description herein is directed towards a particular example in which an auxiliary display device is coupled to a main computer system, and an installer (e.g., an operating system component running on the main computer system) works with auxiliary display device code and data to automatically enable the applications that the device indicates it desires.

However, numerous other types of devices may similarly leverage the technology described herein, including devices not conventionally thought of as being "computer-system" add-on devices, such as television sets, audio receivers, audio/video recorders, telephones, a separate computer, a mobile communications device, a secondary display screen with actuators, a watch, a wall (e.g., kitchen) display, a display screen, a digital picture frame, a clock, a radio, a media player, a device embedded within or using the main display of a consumer electronics device, automotive, transportation or other vehicular units, keyboards or other input devices of the main computer system, a pager, a personal digital assistant, and so forth. As such, the present invention is not limited to the examples, structures or functionality described herein; rather, any of the examples, structures or functionality described herein are non-limiting, and the present invention may be used various ways that provide benefits and advantages in computing and device usage in general.

Figure 2:
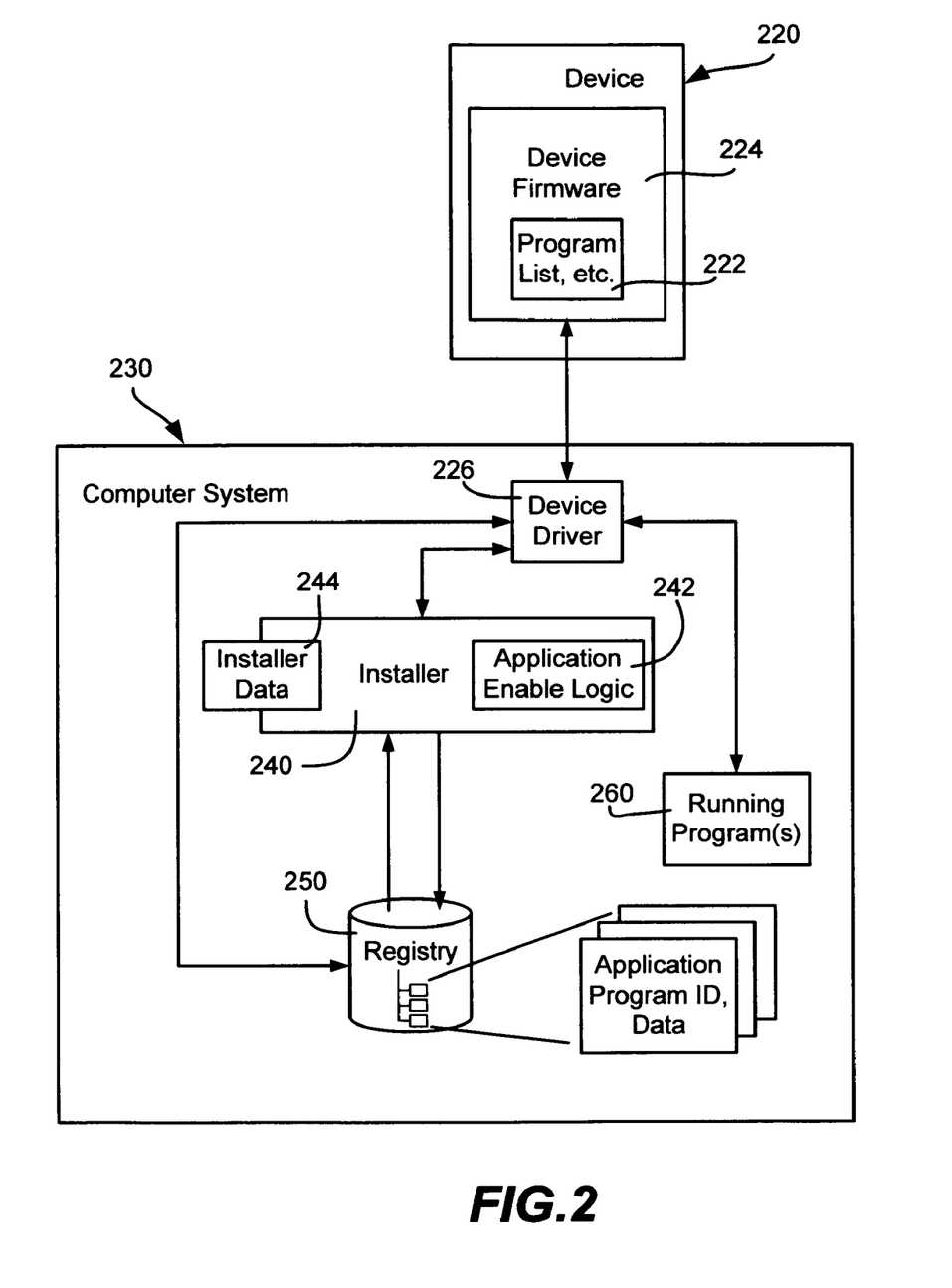
FIG. 2 is a block diagram generally representing components for automatically enabling and configuring one or more application programs for operation with a device in which a program list is maintained in device firmware.

Turning to FIG. 2 of the drawings, there is shown an example block diagram including various components by which a device 220 provides information to a computer system 230 (such as one based on the computer 110 of FIG. 1) to enable and/or configure application programs that may run on the computer system for working with the device 220. Note that as described below, corresponding application programs may already be installed on the computer system, however if not yet installed, the components may pre-enable and/or pre-configure the application programs for a future time that the application programs are installed. Thus, as used herein, the term "enable" is essentially synonymous with "pre-enable" in that the enabled application program will work with the device the next time the application program is run, regardless of how installed and/or executed, e.g., automatic following enabling, started by the user or another process, started by the device, or started sometime later following installation of the program.

In general, when connecting a device 220 to the computer system 230, the technology described herein allows the device manufacturer (and/or an intermediate third party such as an independent vendor or service provider), to specify a data set containing data the device wants the computer 230 (e.g., an operating system component) to process. In one example implementation, the data set comprises a list 222 or other data structure that identifies a set of one or more application programs, along with possibly other information. The listed application program or programs are those that the device 220 indicates it wants to be automatically enabled to work with the device 220, when the program(s) are run on the main computer system 230. Note that in general an "enabled" application means that when run, the application program can communicate with the device 220, e.g., provide data to and/or receive data from the device, including possibly providing code to the device for running some part of the program on the device. Other information may be specified in the list, including application configuration and/or operating parameters, as well as other information. For example, with an auxiliary display device, the list may include one or more endpoint identifiers for each application program, wherein an endpoint generally refers to a data consumption component, e.g., a destination for communication such as a particular auxiliary device application and a contract (e.g., a format) for the data.

In the implementation exemplified in FIG. 2, this data set/list 222 is embedded in the device firmware 224, making it tamper-resistant, and also ensuring that the list 222 travels with the device wherever the device is connected. As described above, the list 222 identifies each application program with which the device 220 desires to work; examples of such programs include manufacturer-specific programs, e.g., a Microsoft® Hardware auxiliary display keyboard widget, and/or a third-party application, e.g., an auction service connector or an email application program such as Microsoft® Outlook. The application programs may be already installed on the computer system and then enabled, or installed at a later time and automatically enabled when installed, (or semi-automatically enabled, e.g., with some small amount of user interaction such as responding to a prompt).

In general, the device 230 communicates with the computer system via a driver 226 running on the main computer system 230. The loading of a driver is a well-known operation, e.g., automatically initiated via Plug-and-Play (PnP)-based technology. In the example implementation represented in FIG. 2, the device manufacturer provides the list 222 comprising application identifiers (and possibly other application configuration data) in the device firmware 224.

During device installation, a class installer 240 for the appropriate category of device is started. Note that this is already standard operating behavior in contemporary Windows®-based operating systems, where the device identifier is obtained upon connecting to the computer system, and the device identifier is used to obtain driver-related and other information including a corresponding ".inf" file that contains class and other information about the device, (such as possibly specifying a supplemental "co-installer").

As is known, a class installer is a common component (e.g., like a library containing functionality common to devices in a device class) for a specific class of device that runs each time a device in that category is installed. A class installer allows for a common set of actions to be executed every time a new device is installed, and is typically invoked at key points in the device's association with the personal computer, including installation, removal, driver updating, troubleshooting, and configuration. As described below, an auxiliary display class installer performs a number of tasks to aid the platform in device management, including allowing devices to specify pre-enabled applications, and ensuring any proper co-installers are run.

As is also known, a co-installer (e.g., comprising a more device-specific installer for supplemental installation functionality not tied to a specific class, but possibly referenced by the class installer) may be similarly used to obtain the list and perform the application program-enabling operations. WPD (the Windows® Portable Device infrastructure) may expose a CoInstaller interface that can be used by any corresponding device; WUDF (Windows® user-mode driver framework) may expose a CoInstaller entrypoint. The WUDF CoInstaller may ensure the WUDF service is started and set to auto-start.

Thus, as used herein, the term "installer" represents any type of installation-related program, including for example a class installer, co-installer, or some combination of both. Further documentation on class installers and co-installers may be found publicly, e.g., on the Internet under MSDN (Microsoft Developer Network)-provided sites.

As generally represented in FIG. 2, the installer 240 includes application enable logic 242 that obtains the list 222, and uses information in the list along with possibly other data 244 to enable the application to work with the device 220. Examples of other data 244 that the installer 240 may process include policy data that may override device-specified information, user preference data, priority data that resolves application program conflicts, and so forth. Example steps that may be performed by the application enable logic 242 to perform the enabling operations are described below with reference to FIG. 5.

By way of a more specific example using an auxiliary display platform that adds a new class of devices to contemporary computing environments, for an auxiliary display device, the class installer that is started is one for an auxiliary display category of devices. During its operation, the class installer 240 makes a query request for the list 222 that includes any application identifiers. If a list 222 exists, the driver 226 provides the list 222 from the location in which the list 222 is stored, e.g., from the firmware 224 in this example, but also possibly from other locations as described below with reference to FIGS. 3 and 4.

Operating system components on an auxiliary display-capable device computer system may include the auxiliary display platform, comprising drivers, a control panel applet, application programming interfaces, system data providers (where a system data provider comprises another component of the auxiliary display platform that supplies system information such as time, wireless signal strength and battery level to auxiliary displays), and so forth. The driver or drivers comprise a core portion of the auxiliary display platform that facilitates communication with auxiliary display devices. The auxiliary display control panel applet (or set of applets) comprises a set of one or more control panel screens that configure auxiliary displays and applications for auxiliary displays. The platform includes computer system-provided APIs that enable applications to communicate with the auxiliary display platform; other APIs include SPOT (Smart Personal Object Technology) platform APIs that allow applications to be written on a SPOT device.

In one implementation, the automatic enabling and configuration technology makes use of Plug-and-Play (PnP) technology, the Windows® Portable Device (WPD) infrastructure and the Windows® User-mode Driver Framework (WUDF) for the auxiliary display driver framework to manage much of the device installation process. However, as described above, additional tasks may be performed when a new auxiliary display is installed for the first time. These include populating the list of applications that the device manufacturer would like pre-enabled for the device, writing information into the registry for the auxiliary display control panel to use, and enabling system data providers since they do not run on computer systems that do not have an auxiliary display.

With respect to initially coupling a new device, Windows® Portable Device (WPD) is essentially a platform that enables connection to portable devices such as MP3 players, digital cameras and the like, and this platform is leveraged by auxiliary displays in this example. Note that function discovery is a core operating system component that handles device connections to the system and provides a way to access these devices. WUDF, (Windows® user-mode driver framework), provides a sandboxed environment in which user mode drivers are run. An application running on the computer system may register with the auxiliary display platform to send data to auxiliary display devices. This may be enabled or disabled from the auxiliary display control panel.

Returning to FIG. 2, in general, when the installer 240 obtains the list 222, information corresponding to the list is written (e.g., if allowed by policy or not otherwise overridden) into the device's configuration section of the registry 250 that controls the granting of permissions for application programs to access devices, e.g., auxiliary display devices. For an example auxiliary device, the information comprises an application ID and device endpoint ID pair for each application. The installer 240 retrieves this information from the driver 226, and, after evaluating the information and possibly modifying it, causes the information to be written into the device property store in the registry 250. In one example implementation, the driver 226 performs the write, however alternatives may be implemented in which the installer 240 or another component performs the write.

Once written, this information is read by the permission manager, whereby the application or applications are enabled on the device. If the application is not installed, the registration information is still written to the registry 250, but does not have any effect until the appropriate application is installed and run, and thereafter registers itself with the auxiliary display platform.

The registry data permits each enabled application to communicate with the device when the application is a running program 260. Note that another program, such as a gadget manager for an auxiliary display device, may automatically run each specified application program that is written to the registry, (provided that the application program is already installed), whereby the enabled application program will now be able to send data to the device, and if appropriate, receive data from the device. If not yet installed, the application's identifier and any other data is maintained in the registry 250, whereby the application program is automatically enabled for use with the device if and when the application program is later installed.

Figure 3:
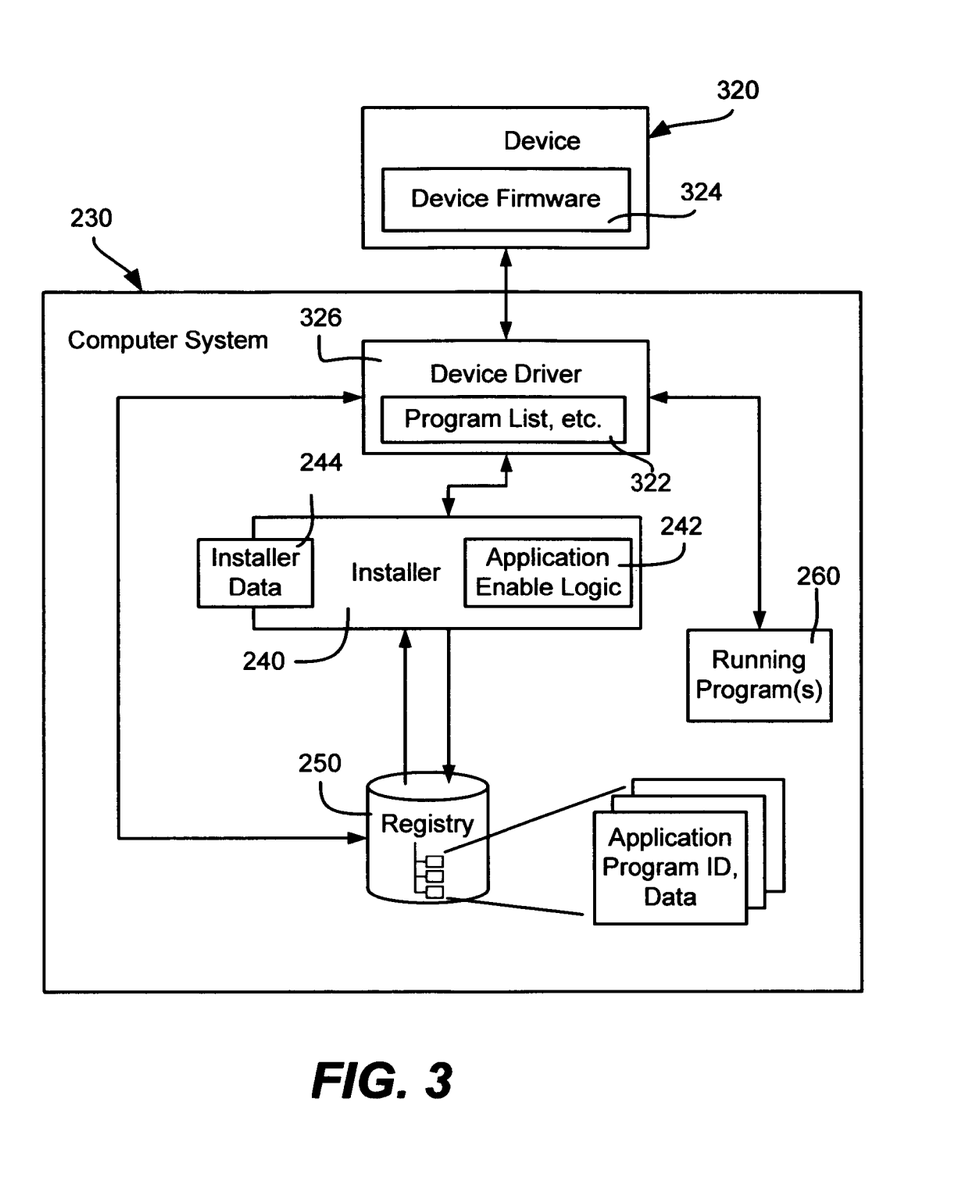
FIG. 3 is a block diagram generally representing components for automatically enabling and configuring one or more application programs for operation with a device in which a program list is maintained by a device driver.

In one alternative implementation, exemplified in FIG. 3, the application list 322 is built into the device driver 326. While not as tamper-resistant and otherwise not as integral to the device as the firmware list model represented in FIG. 2, the model of FIG. 3 provides some additional flexibility, as the program data set/list 322 may be updated as easily as updating the driver 326. For example, this driver-based model may provide further value when certain application versions are required, e.g., the data set 322 may also specify version data for a certain application version that is required, whereby an updated driver may update the version data.

Figure 4:
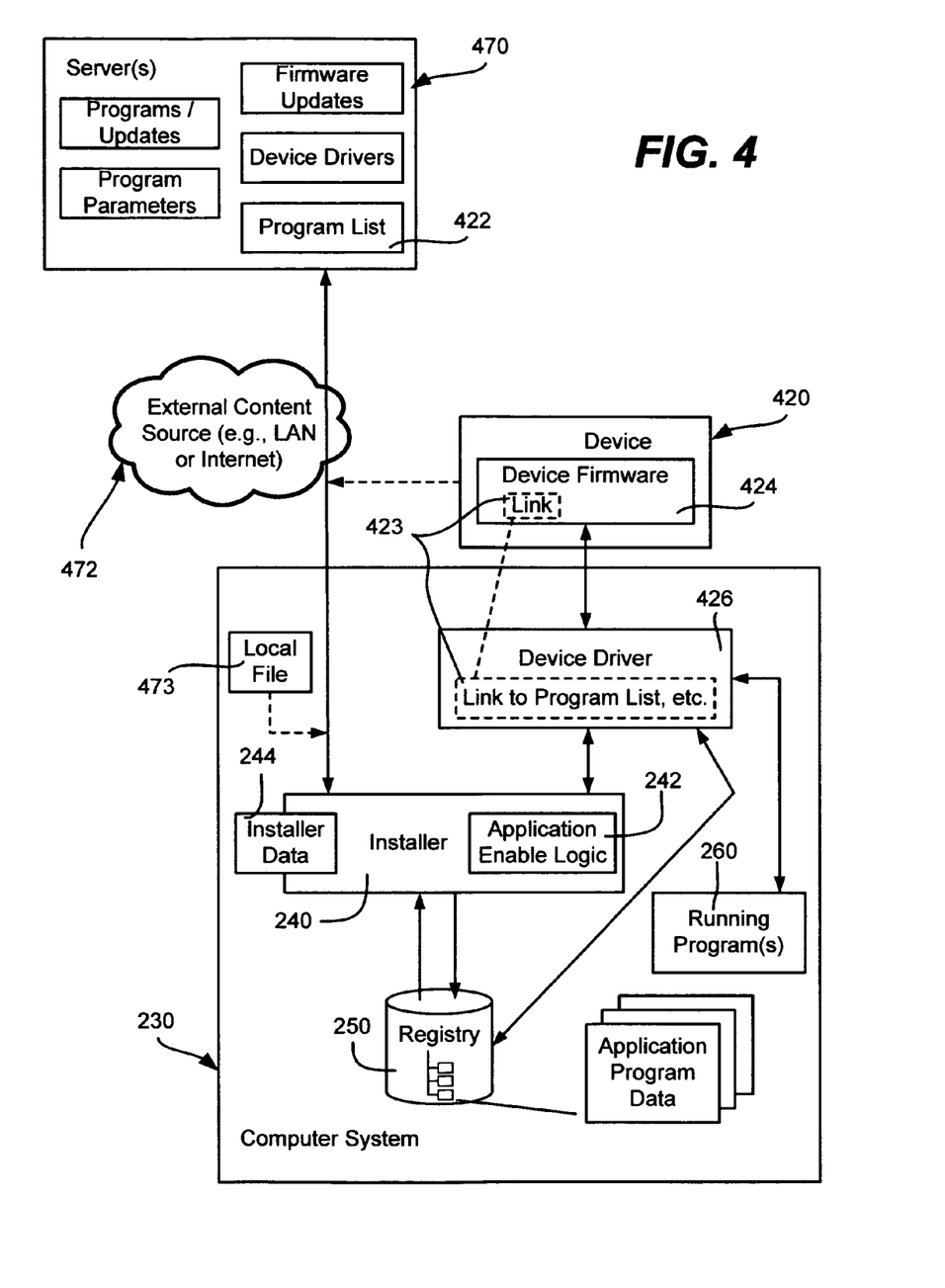
FIG. 4 is a block diagram generally representing components for automatically enabling and configuring one or more application programs for operation with a device in which a program list is maintained at a linked-to location.

In another alternative implementation, exemplified in FIG. 4, the list 422 is maintained at an external location, e.g., at a remote source such as a server 470 site accessible via an intranet or the internet 472, and/or in another local file 473. The device firmware 424 and/or the driver 426 contains a link 423 to the data set (list) 422, whereby the installer 240 (or the device 420) uses the link 423 to locate and read the list 422. In general, this is the most flexible model, as the device manufacturer can change the list at anytime, as well as provide different lists for different device versions as the device evolves over time regardless of driver updating. However, in addition to being less secure, a drawback is that this requires that the source location remain fixed and be accessible when needed, e.g., a connection to the Internet may be required, (although this is something becoming commonplace in computing).

As can be readily appreciated, a combination of these models, possibly with a priority/version ordering, may be used. For example, if an Internet connection is available, the list accessed via the Internet may be used first, (e.g., provided there is no security conflict with other, more secure lists). If the external program list cannot be accessed, the device driver may apply its own updated list, if one is present (again, firmware data may be used for security purposes). If no Internet connection is available, and the device driver does not have a list, the list in firmware may be used. This ensures that at least one list is always present, with the most updated list used whenever possible, subject to security or similar considerations. Unions or intersections of data sets of distinct sources also may be performed. Note that as described above, the installer 240 also may contain its own data 244 and possibly its own list, such as based on policy and/or user preferences that override device preferences. The installer data 244 may supersede device-specified data, or may be combined with it to some extent, e.g., by a union, an intersection, logical OR-ing, logical AND-ing, and so forth.

Note that as represented in FIG. 4, the server or servers may 470 also contain other information, including programs and/or updates, program parameters, firmware updates and device drivers. Thus, regardless of the ultimate source or sources of the data set (list) 422, when the list 422 is combined with the ability to download the relevant driver from a remote source, and also download one or more applications /updates when a new device is installed, the technology provides a powerful, seamless user experience for device installation, particularly if the device coupling is automatically detected and the needed software automatically downloaded. Further, this reduces the burden and complexity on the device manufacturer, as the manufacturer generally need not ship additional media such as a CD-ROM.

In addition to enabling the application program or programs, the device-related list may provide and/or change the configuration parameters of an application installed on the computer system 230. The application's parameters can be stored in the registry 250 and used to control or otherwise be provided to an application program when the program is executed. For application programs not yet installed, the device may specify configuration parameters to use should the program be later installed and executed.

In general, any device-specified programs and/or their corresponding configuration/operating parameters may be changed by policy, user preferences, or user interaction. For example, network or system policy configured by an administrator may prevent a particular application from communicating with a particular device. As another example, a device may specify that an email program be run on the main computer system and communicate with the device, with parameters that specify that all email and calendar data communicated to the device. However, user preferences, set up before or after device installation, may filter which messages and/or calendar data is sent to the device.

Moreover, users at the appropriate (e.g., administrator) level are able to disable device-specified applications. For example, with a Windows®-based operating system, this may be accomplished via the control panel applet, with the "add/remove programs" control panel used to uninstall the application programs from the computer system. The device's control panel applet may require some information about the device that is not provided as part of a standard device installation. For example, a device installation date allows the control panel applet to show devices in the order that they were installed. To maintain this information, the installer 240 (or other component, e.g., the driver 226) may write the current system date and time into the registry 250 so that the control panel applet can use it.

As can be readily appreciated, specifying a set of desired applications for pre-enabling allows manufacturers to essentially bundle a set of applications that are appropriate for their device and ensure that those programs will (ordinarily) automatically appear on the device, with no user intervention needed if the programs are already installed on the computer system. This is particularly useful for remote-controlled conventional and/or auxiliary displays (e.g., controlled via a Windows® Media Center Edition remote control) that require a specific remote control application to make them work.

Turning to an explanation of example steps taken upon installation of a device, as described above, the installer component performs tasks that occur upon installation/removal of a device. For example, the installer may implement the pre-enabling of applications for a particular device, write the timestamp of device installation to the device property store so a control panel applet can determine device ordering, and ensure the one or more system data providers are running and are set to continue to run.

Figure 5:
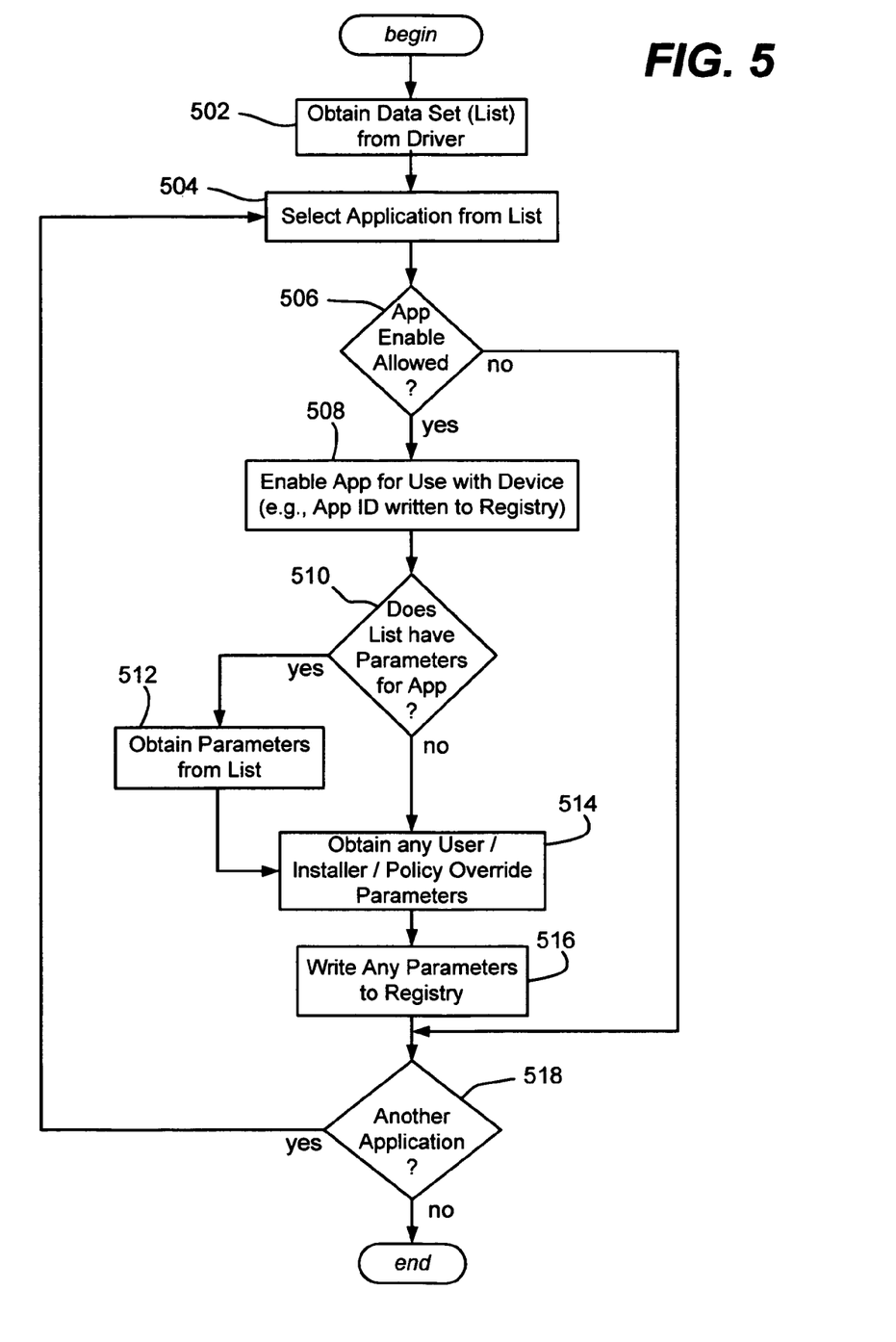
FIG. 5 is a flow diagram generally directed towards showing example logic that may be performed by an installer or the like to perform application program enabling operations.

As generally represented in the flow diagram of FIG. 5, with respect to pre-enabling applications, there is provided a mechanism by which a device can specify a set of applications which should automatically be enabled for that device, e.g., the data set obtained from the device driver at step 502. For example, during device installation, the DIFx (Driver Install Frameworks), comprising driver install technologies and tools generally related to Plug and Play) mechanism calls into the class installer to perform additional installation steps, represented via steps 504-518.

More particularly, step 504 represents the selecting of an application from the list, with step 518 repeating the process for each listed application. For example, in one implementation, device permission settings are stored in the device property store, whereby the class installer, in response to a message (DIF_NEWDEVICEWIZARD_FINISHINSTALL, for example) opens the device and sends a WPD (Windows® Portable Device) command to instruct the driver to read and act upon the pre-enabled application data.

For each application, step 506 represents evaluating whether the device-specified application can be enabled for the computer system, e.g., the enabling of a given application may be blocked via policy and/or user preference data. If not allowed, the process branches ahead to step 518 to select the next application, if any. Note that although not shown in FIG. 5, e.g., on the "no" branch of step 506, among other possible steps, a substitute application may be enabled via policy and/or user preference data.

In the typical event in which the application's enabling is allowed, step 506 branches to step 508 where the installer enables the application, e.g., by causing the application identifier to be written to the registry to enable the application. In general, the driver may add the permission information to the property store, and send out appropriate notifications to clients. In one example implementation, on the driver side, a helper library receives an "install pre-enabled applications" command and issues a proper DDI call to the driver implementation.

Steps 510 and 512 represent obtaining other device-provided parameters for the application, which may be overridden and/or supplemented with user preferences/installer data/policy data as represented by step 514. Step 516 maintains these parameters in association with the application program, e.g., in the registry.

Thus, assuming the driver returned a valid list of applications and data, (e.g., <APPLICATION_ID, ENDPOINT_ID> pairs for an auxiliary display device), the process ordinarily proceeds without error. Note that although not shown in FIG. 5, the installer attempts to work through any errors that it may encounter, and although certain errors may cause some functionality to not occur, (e.g., pre-enabling a given application program), such an event does not necessarily prevent or inhibit the rest of the device from working properly; (when necessary most if not all of what is done by the installer may also be done manually by the user or another utility). For example, if application pre-enabling fails, a critical error need not be returned from the installer, thereby allowing device installation to otherwise function. The user may have to manually enable certain applications for that device.

Also, although not specifically represented in FIG. 5, device-related parameters may also be preserved in association with the installation. For example, to provide a more consistent user experience in the control panel applet, a deterministic way to order devices may be used, e.g., based on time of installation of each device (although other ordering schemes are feasible). Note that currently, Windows®-based operating systems do not track the time/date of when a device was first installed.

For example, to provide an installation timestamp, the class installer may respond to a DIF_INSTALLDEVICE (or potentially DIF_NEWDEVICEWIZARD_FINISHINSTALL) code by writing a key/value to the device property store. The system time may be retrieved as a 64-bit value by calling a GetSystemTimeAsFileTime method. Using the RegSetValueEx method, this value is set as type REG_QWORD (64-bit value), with the key being "InstallationTime" or the like. The registry location to which this key is written is retrieved using the SetupDiOpenDevRegKey method. The key may be stored in the hardware portion of the device-specific registry; e.g., according to MSDN that location may be HKLM\SYSTEM\CurrentControlSet\Enum\enumerator\ deviceID.

When invoked, the control panel applet may use the same or similar methods (SetupDiOpenDevRegKey) to open the hardware key and then RegQueryValueEx to query the value of the "InstallationTime" key. The control panel applet can use the CompareFileTime method to compare FILETIME structures to determine the proper device ordering.

Note that if the installation timestamp operations fail, an error from the installer need not be returned, with the installer instead performing a silent failure, or possibly providing only a warning. Again, not halting installation because of such an error allows the device to still be used. Although the ordering will not be time-based, at least not for this particular device, the control panel may use another mechanism to order devices without the timestamp, e.g., they may be ordered alphabetically, or simply listed in no particular order.

As can be seen from the foregoing, there is provided a consistent installation-like mechanism for add-on devices, such as basic and enhanced auxiliary display devices. The mechanism ensures that appropriate data is written into the registry for device-specified programs to use the device. The device manufacture is able to use the mechanism to specify a set of applications to pre-enable by default.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At a computer system, the computer system including a processor and system memory, the computer system including an operating system and ports for connecting other devices to the computer system, the computer system also including a registry that stores configuration data for the computer system, a method for configuring applications to communicate with a connected device, the method comprising:

the operating system detecting that a device has been connected to a port of the computer system;

the processor loading a device driver for the device in response to the operating system detecting that the device was connected;

the device driver providing information for accessing a list of one or more applications the device indicates are to be enabled to communicate with the device when run on the computer system, the list of applications including one or more application identifiers and corresponding configuration data, each application identifier identifying an application that is to be configured to communicate with the device in accordance with corresponding configuration data for the application; and an installer receiving the provided information from the device driver;

the installer using the provided information to access the list of applications; and the installer writing the one or more application identifiers along with corresponding configuration data into a device property store in the registry to enable the one or more applications to compatibly communicate data with the device when run on the computer system, enabling the one or more applications pre-enabling at least one application to communicate with the device, wherein the at least one application is not installed on the computer system.

2. The method of claim 1 wherein writing the one or more application identifiers along with corresponding configuration data into a device property store in the registry comprises writing permission data to allow the application program to communicate with the device.

3. The method of claim 1 wherein writing the one or more application identifiers along with corresponding configuration data into a device property store in the registry comprises writing an application identifier and corresponding data into the registry for an application that is not installed on the computer system so as to pre-enable the application to communicate data with the device.

4. The method of claim 1 wherein the configuration data for the one or more applications includes configuration parameters related to the running of the one or more applications at the computer system.

5. The method of claim 1 wherein providing information for accessing a list of one or more applications the device indicates are to be enabled to communicate with the device when run on the computer system comprises communicating with the device driver to access the one or more application program identifiers from the device driver, wherein the one or more application program identifiers are contained in the device driver.

6. The method of claim 1 wherein providing information for accessing a list of one or more applications the device indicates are to be enabled to communicate with the device comprises communicating with the device driver to access the one or more application program identifiers from the device driver, wherein the one or more application program identifiers are stored in the device.

7. The method of claim 1 wherein providing information for accessing a list of one or more applications the device indicates are to be enabled to communicate with the device comprises:
    receiving a link to the program list from the device driver, the link to an external storage location that is accessible via network communication; and
    using the received link to locate and read the list of one or more applications from the external storage location.

8. A computer program product for use at a computer system, the computer system including an operating system and ports for connecting other devices to the computer system, the computer system also including a registry that stores configuration data for the computer system, the computer program product for implementing a method for configuring applications to communicate with a connected device, the computer program product comprising one or more computer storage media having stored thereon computer-executable instructions that, when executed at a process, cause the computer system to perform the method, including the following:
    detect, at the operating system, that a device has been connected to the computer system;
    load a device driver for the device in response to detecting that the device was connected;
    provide, at the device driver, information for accessing a list of one or more applications that are to be enabled to communicate with the device when run on the computer system, the list including one or more application identifiers and corresponding configuration data, each application identifier identifying an application that is to be configured to communicate with the device in accordance with corresponding configuration data for the application;
    receive, at an installer, the provided information;
    use, at the installer, the provided information to access the list of applications; and
    write, at the installer, the one or more application identifiers along with corresponding configuration data into a device property store in the registry to enable the one or more applications to compatibly communicate data with the device when run on the computer system, enabling the one or more applications pre-enabling at least one application to communicate with the device, wherein the at least one application is not installed on the computer system.

9. The computer program product of claim 8 wherein the list of one or more applications is obtained from firmware of the device prior to providing the list of one or more applications to the installer.

10. The computer program product of claim 8 wherein the list of one or more applications is built into the device driver.

11. The computer program product of claim 8 wherein the device is selected from among: an auxiliary display; a television; a media player; a storage device; a digital picture frame; a clock; a kitchen display; a separate computer; a mobile communications device; a secondary display screen with actuators; a watch; a wall display; a display screen; a radio; a device embedded within or using the main display of a consumer electronics device a keyboard; a pager; and a personal digital assistant.

12. The computer program product of claim 8 wherein the device is an auxiliary display device, and wherein the one or more applications is selected from among an email program and calendar program.

13. A computer system, the computer system comprising:
    system memory;
    one or more processors;
    one or more ports for connecting other devices to the computer system;
    one or more computer storage medium having stored thereon a registry and having stored thereon computer-executable instructions representing an operating system, a device driver, and an installer wherein the operating system is configured to:
        detect that a device has been connected to the computer system; and
        load a device driver for the device in response to detecting that the device was connected;
    wherein the device driver is configured to:
        provide information for accessing a list of applications to the installer, the list of applications indicating applications that are to be enabled to communicate with the device when run at the computer system, the list of applications including one or more application identifiers and corresponding configuration data, each application identifier identifying an application that is to be configured to communicate with the device in accordance with corresponding configuration data for the application; and
    wherein the installer is configured to:
        receive the provided information from the device driver;
        use the provided information to access the list of applications; and
        writing the one or more application identifiers along with corresponding configuration data into a device property store in the registry to enable the one or more applications to communicate data with the device when run on the computer system, enabling the one or more applications pre-enabling at least one application to communicate with the device, wherein the at least one application is not installed at the computer system.

14. The system of claim 13 wherein the device driver being configured to provide information for accessing a list of applications to the installer comprises the device driver being configured to:
    access the list of applications from the device subsequent to the device being connected to the computer system; and
    provide the list of applications to the installer subsequent to access the list of applications from the device.

15. The system of claim 13 wherein the device driver being configured to provide information for accessing a list of applications to the installer comprises the device driver being configured to provide the list of applications to the installer, wherein the list of applications is contained in the device driver.

16. The system of claim 13 wherein the device driver being configured to provide information for accessing a list of applications to the installer comprises the device driver being configured to:

access a link to the list of applications from the device subsequent to the device being connected to the computer system; and provide the link to the installer subsequent to access the list of applications from the device.

17. The system of claim 13 wherein the device driver being configured to provide information for accessing a list of applications to the installer comprises the device driver being configured to provide a link to the list of applications to the installer, wherein the link is contained in the device driver.

\* \* \* \* \*